Patented Feb. 8, 1949

2,461,341

UNITED STATES PATENT OFFICE

2,461,341

SECONDARY SULFOLANYL AMINES

Rupert C. Morris, Berkeley, and Alva V. Snider, Richmond, Calif., assignors to Shell Development Company, San Francisco, Calif., a corporation of Delaware No Drawing. Application January 26, 1946, Serial No. 643,835

3 Claims. (Cl. 260—329)

This invention relates to a novel and particularly useful class of compounds comprising the secondary amines of cyclic sulfones having the amino-nitrogen atom directly attached to a cyclic organic radical. More particularly, the invention pertains to sulfolanyl and sulfolenyl secondary amines having the amino-nitrogen atom directly attached to a cyclic organic radical. An outstanding group of compounds of the invention comprises the sulfolanyl and sulfolenyl secondary amines wherein the nitrogen atom is directly attached to a carbocyclic radical, preferably a cycloalkyl radical.

The sulfolanyl and sulfolenyl secondary amines of the invention contain a five-membered hetrerocylic ring consisting of four nuclear carbon atoms and a sulfonyl radical and have at least one of the nuclear carbon atoms directly attached by a single bond to an —NH— group which is linked directly to a cyclic organic radical.

The novel sulfolanyl secondary amines of the invention contain a five-membered heterocyclic ring consisting of four saturated nuclear carbon atoms and a sulfonyl radical and have at least one of the nuclear carbon atoms directly attached by a single bond to an —NH— group which is linked directly to a cyclic organic radical. The sulfolanyl secondary amines may be represented by the formula

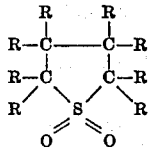

wherein at least one of the R's is the —NH—R₁ radical, R₁ representing a cyclic organic radical, and the remaining R's are members of the group consisting of the hydrogen atom and the organic radicals.

The sulfolenyl secondary amines of the invention contain a five-membered heterocyclic ring consisting of four nuclear carbon atoms and a sulfonyl radical and having a double bond between two vicinal nuclear carbon atoms, and have at least one of the nuclear carbon atoms directly attached by a single bond to an —NH— group which is linked directly to a cyclic organic radical. The sulfolenyl secondary amines may be represented by the formulae

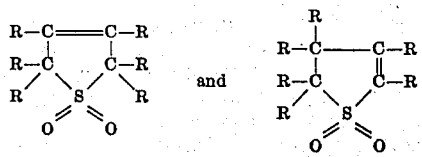

wherein at least one of the R's is the —NH—R₁ group, R₁ representing a cyclic organic radical, and the remaining R's are members of the group consisting of the hydrogen atom and the organic radicals.

A valuable group of cyclic sulfone secondary amines of the invention comprises those compounds containing a five-membered heterocyclic ring consisting of four nuclear carbon atoms and a sulfonyl radical and having one of the nuclear carbon atoms directly attached to an —NH— group which is linked directly to a cycloalkyl radical, each of the remaining free bonds of the nuclear carbon atoms being directly attached to a member of the group consisting of the hydrogen atom and the hydrocarbon radicals.

The cyclic organic radicals which are directly attached to the amino-nitrogen atom may be carbocyclic or heterocyclic radicals. Suitable heterocyclic radicals, which may be saturated or unsaturated, are those having embraced in the cycle carbon and at least one other element such as oxygen, sulfur and nitrogen. Examples of such heterocyclic radicals are pyranyl, dihydropyranyl, tetrahydropyranyl, dioxanyl, thiophenyl, tetrahydrothiophenyl, furanyl, tetrahydrofuranyl, sulfolanyl, sulfolenyl, pyridinyl, piperidinyl, anilinyl, and the like and their homologues and analogues.

However, the cyclic organic radical which is directly attached to the amino-nitrogen atom is preferably a carbocyclic radical which may be saturated, unsaturated or aromatic. Particularly valuable cyclic sulfone secondary amines are those wherein the carbocyclic radical is a cycloalkyl radical, more preferably a cyclohexyl radical. Examples of the preferred cycloalkyl radicals are cyclopropyl, cyclobutyl, cycloamyl, cyclohexyl, 3,5 - dimethylcyclohexyl, 3,3,5-trimethylcyclohexyl, 3,3,5-triethylcyclohexyl, 3,3-dimethyl - 5 - ethylcyclohexyl, 3 - methyl-3,5-diethylcyclohexyl, cycloheptyl, cyclooctyl and the like. Other carbocyclic radicals include phenyl, 3,5-dimethylphenyl, pentamethylphenyl, cyclohexadienyl, cyclohexenyl, 3,5,5-trimethyl-2-cyclohexenyl, cyclopentenyl, cyclopentadienyl, and the like and their homologues.

The organic radicals which R may represent may be cyclic or acylic, saturated, unsaturated or aromatic, and include the alkyl, aryl, alkenyl, aralkyl, aralkenyl, alkenaryl, cycloalkyl, cycloalkenyl and heterocyclic radicals such as methyl, ethyl, propyl, isopropyl, butyl, isobutyl, sec-butyl, tert-butyl, amyl, hexyl, vinyl, allyl, chloroallyl, methallyl, crotyl, butadienyl, phenyl, dichlorophenyl, pentachlorophenyl, xylyl, benzyl, styryl, cinnamyl, sulfolanyl, sulfolenyl, furfuryl, tetrahydrofurfuryl, tetrahydrothiophenyl, cyclohexyl, 3,3,5-trimethylcyclohexyl, cyclohexenyl, 3,5,5-trimethyl-2-cyclohexenyl, cyclopentadienyl, propargyl, and the like and their homologues. However, when R represents an organic radical, it is preferably a hydrocarbon radical or a halogen-substituted hydrocarbon radical, and more preferably a hydrocarbon radical of saturated character, i. e. not readily hydrogenatable, such as the alkyl, cycloalkyl, aryl, aralkyl and alkaryl radicals. Examples of the saturated hydrocarbon radicals include methyl, ethyl, propyl, isopropyl, butyl, isobutyl, sec-butyl, tert-butyl, cyclohexyl, cyclopropyl, phenyl, xylyl, benzyl, cresyl and 3,3,5-trimethylcyclohexyl.

Sulfolanyl and sulfolenyl secondary amines having the nuclear carbon atom in the 3-position directly attached to the —NH— group which is linked directed to a 3,3,5-trialkylcyclohexyl radical, each of the remaining free bonds of the nuclear carbon atoms being directly attached to a member of the group consisting of the hydrogen atom and the alkyl radicals, possess unexpectedly valuable properties which make them of particular use in various industrial applications. An example of a particularly valuable N-3,3,5-trialkylcyclohexyl-2-sulfolen-3-xylamine is N-3,3,5-trimethylcyclohexyl 2-sulfolen-3-ylamine. N-3,3,5-trimethylcyclohexyl 3-sulfolanylamine is an N-3,3,5-trialkylcyclohexyl 3-sulfolanylamine of outstanding value.

The numbering system of the sulfolane or sulfolene ring is indicated below:

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84. The system may be exemplified by the compound having the structure

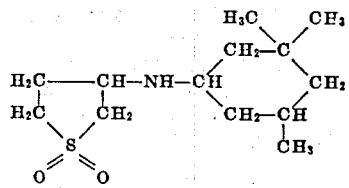

which is termed N-3,3,5-trimethylcyclohexyl 3-sulfolanylamine. The compound having the structure

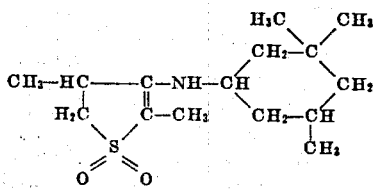

is termed N-3,3,5-trimethylcyclohexyl 2,4-dimethyl-2-sulfolen-3-ylamine.

Compounds of the type of 3-sulfolanylamine and N-methyl 3-sulfolanylamine are disclosed in the prior art. In all of these compounds, the radical which is attached to the amino-nitrogen atom is an alkyl radical or the hydrogen atom. Novel compounds have now been prepared wherein the radical joined to the cyclic sulfone group by means of the —NH— radical is a carbocyclic radical. That is, the newly prepared compounds comprise a sulfolane or a sulfolene ring which has at least one of the nuclear carbon atoms attached to the —NH— radical which is linked to a carbocyclic radical. Surprisingly, it has been found that these N-carbocyclic cyclic sulfone amines of the invention possess inherent properties which are markedly superior to those of the corresponding N-alkyl cyclic sulfone amines. These properties could not be foreseen, and they are of such a nature as to make the compounds of the invention particularly useful in various industrial applications.

The secondary sulfolanylamines having the amino-nitrogen atom directly attached to a carbocyclic radical are prepared by reacting the corresponding sulfolene with the carbocyclic amine in the presence of a base such as potassium hydroxide, sodium hydroxide, or the like. For example, N-cyclohexyl 3-sulfolanylamine is prepared by reacting 3-sulfolene and cyclohexylamine in the presence of potassium hydroxide; 3,3,5-trimethylcyclohexylamine is reacted with 2,4-dimethyl-3-sulfolene to produce N-(3,3,5-trimethylcyclohexyl) 2,4-dimethyl-4-sulfolanylamine. This reaction may be carried out in any suitable type apparatus, but it is preferred to use a pressure vessel. Any suitable temperature is maintained, preferably between about 25° C. and about 120° C., and more preferably between about 50° C. and about 65° C. The amine and the sulfolene may be reacted in any convenient proportions, although in some cases it may be desirable to have a molar excess of the carbocyclic amine over the sulfolene.

The N-carbocyclic cyclic sulfone amines may also be prepared by condensing an aldehyde or ketone with an amino cyclic sulfone, and subsequently hydrogenating the resultant substituted imine. For example, by condensing dihydroisophorone with 3-amino sulfolane and hydrogenating the product, N-3,3,5-trimethylcyclohexyl-3-sulfolanylamine is produced. Alternatively, the direct reaction of 3-sulfolene, ammonia, dihydroisophorone and hydrogen may be found effective.

A suitable method for preparing the N-carbocyclic sulfolenylamines comprises reacting sulfur dioxide with the appropriate conjugated diolefinic compound having one of the unsaturated carbon atoms linked to an —NH— group which is linked to a carbocyclic radical. This reaction may be represented by the general equation

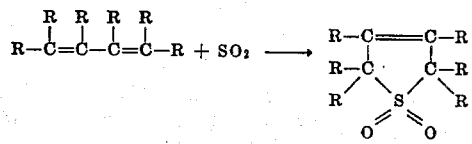

wherein one of the R's is —NH—R₁, R₁ representing a carbocyclic radical, and the remaining R's are preferably hydrogen atoms or alkyl radicals. These N-carbocyclic sulfolenylamines may be hydrogenated to produce the corresponding N-carbocyclic sulfolanylamines, preferably in the presence of a suitable hydrogenation catalyst.

The novel N-carbocyclic sulfolanylamines and N-carbocyclic sulfolenylamines of the invention find utility in a large variety of industries. For example, the secondary amines may be used as insecticides, fungicides and parasiticides or as ingredients of insecticidal, fungicidal and parasiticidal compositions, and as ingredients for use in the manufacture of varnishes, polishes, and the like. Also, these novel compounds may be employed in the preparation of natural or synthetic rubbers, resins, plastics, etc., and they are of value in the resin and lacquer industry as plasticizers for the manufacture of dopes, fabric coatings, sprays and moulding compositions. The N-carbocyclic cyclic sulfone amines are of use as antioxidants, pourpoint depressants, ingredients in cosmetics, as base materials and fixing agents in the preparation of perfumes, and as softening agents for the leather industry. The N-cycloalkyl sulfolanylamines and the N-cycloalkyl sulfolenylamines may be further reacted, e. g. sulfurized, sulfated, or the like, to produce valuable substances to be used as addition agents in lubricating oils, greases, and as detergents, as well as for a variety of other purposes.

The N-cyclohexyl sulfolanylamines and the N-cyclohexyl sulfolenylamines, and more particularly the N-3,3,5-trialkylcyclohexyl sulfolanylamines are of particular value as wetting agents and as emulsifying compounds. Moreover the N-3,3,5-trialkylcyclohexyl sulfolanylamines such as N-3,3,5-trimethylcyclohexyl sulfolanylamine are exceptionally valuable as moth repellent agents, and as intermediates in organic syntheses.

The following examples serve to illustrate the invention.

Example I

A mixture of about 476 parts by weight of 3,3,5-trimethylcyclohexylamine, about 338 parts by weight of 3-sulfolene and about 12 parts by weight of potassium hydroxide was reacted at about 60° C. to obtain about 672 parts by weight of product. The product was purified by removing the unreacted trimethylcyclohexylamine at reduced pressure, taking up the residue in ether, washing the ether solution with water, flashing off the ether and drying. The N-3,3,5-trimethylcyclohexyl 3-sulfolanylamine recovered has the following physical constants:

$n_D^{20}$    1.497(1)
$d_4^{20}$    1.0783

Example II

Approximately 608 parts by weight of 3,3,5-triethylcyclohexylamine and about 335 parts by weight of 3-sulfolene are reacted with about 12 parts by weight of potassium hydroxide at a temperature of about 65° C. to produce N-3,3,5-triethylcyclohexyl 3-sulfolanylamine.

Example III

When about 395 parts by weight of 2,4-dimethyl3-sulfolene are reacted with approximately 440 parts by weight of 3,3,5-trimethylcyclohexylamine and about 11 parts by weight of potassium hydroxide according to the procedure of Example I, N-3,3,5-trimethylcyclohexyl 2,4 - dimethyl-4-sulfolanylamine is produced.

Example IV

Sulfur dioxide is reacted with approximately an equimolar amount of 5-(cyclohexylamino)-4-methyl-2,4-pentadiene in the presence of pyrogallol at a temperature between about 95° C. and about 105° C. to obtain N-cyclohexyl 2,4-dimethyl-3-sulfolen-5-ylamine.

Example V

Approximately an equimolar amount of sulfur dioxide and 2-isophorylamino-4-ethyl-2,4-pentadiene are reacted in the presence of pyrogallol at a temperature of about 100° C., and N-isophoryl 2-methyl-4-ethyl-3-sulfolen-2-ylamine is recovered from the reaction mixture.

The following novel compounds are also prepared according to the methods described above: N-3,3,5-trimethylcyclohexyl 3,4-dimethyl-3-sulfolanylamine, N-3,3,5-trimethylcyclohexyl 2-sulfolanylamine, N-3,3,5-triethylcyclohexyl, 2,4-dimethyl - 5 - sulfolanylamine, N-3,3,5-trimethylcyclohexyl 2-sulfolen-3-ylamine, N-cyclopropyl 3-sulfolanylamine, N-cyclopentadienyl 3-sulfolanylamine, N-phenyl 3-sulfolanylamine, N-3,5-dimethylphenyl 2-sulfolanylamine, N-pentamethylphenyl 2,4-dimethyl - 3 - sulfolanylamine, N-naphthyl 2-sulfolen-3-ylamine and N-(2-cyclohexenyl) 3-sulfolanylamine.

We claim as our invention:

1. The compound having the structural formula

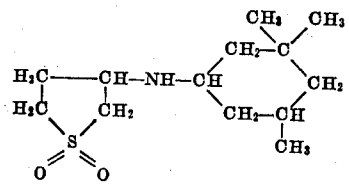

2. The compound having the structural formula

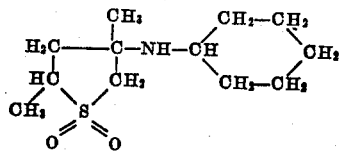

3. A compound having the structural formula

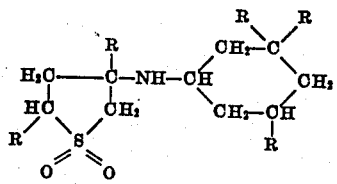

wherein the R's represent members selected from the group consisting of the hydrogen atoms and the alkyl radicals.

RUPERT C. MORRIS.
ALVA V. SNIDER.

REFERENCES CITED

The following references are of record in the file of this patent:

UNITED STATES PATENTS

| Number | Name | Date |
| --- | --- | --- |
| 2,291,798 | Delfs | Aug. 9, 1942 |